(12) United States Patent
Ratcliff

(10) Patent No.: US 12,253,136 B2
(45) Date of Patent: Mar. 18, 2025

(54) ADJUSTABLE ACCUMULATOR FOR SELECTIVELY MODIFYING SPRING RATE OF GAS SPRING SYSTEM

(71) Applicant: Universal Air, Inc., San Bernardino, CA (US)

(72) Inventor: Daniel Zachary Ratcliff, Brea, CA (US)

(73) Assignee: Universal Air, Inc., San Bernardino, CA (US)

( * ) Notice: Subject to any disclaimer, the term of this patent is extended or adjusted under 35 U.S.C. 154(b) by 316 days.

(21) Appl. No.: 17/403,584

(22) Filed: Aug. 16, 2021

(65) Prior Publication Data

US 2023/0051485 A1    Feb. 16, 2023

(51) Int. Cl.
  *B60G 11/27*    (2006.01)
  *B60G 17/056*    (2006.01)
  *F16F 9/02*    (2006.01)
  *F16F 9/512*    (2006.01)

(52) U.S. Cl.
  CPC .......... *F16F 9/0245* (2013.01); *F16F 9/0281* (2013.01); *F16F 9/512* (2013.01); *F16F 2228/066* (2013.01)

(58) Field of Classification Search
  CPC ........ F16F 9/0245; F16F 9/0281; F16F 9/512; F16F 2228/066; B60G 11/27; B60G 13/10; B60G 17/0523; B60G 17/0565; B60G 2202/152; B60G 2202/314; B60G 2500/201
  USPC ............................................ 267/64.11, 64.28
  See application file for complete search history.

(56) References Cited

U.S. PATENT DOCUMENTS

| | | | | |
|---|---|---|---|---|
| 4,335,901 | A * | 6/1982 | Gladish | B60G 17/04 280/6.151 |
| 6,698,730 | B2 * | 3/2004 | Easter | F16F 9/05 267/64.22 |
| 8,876,133 | B2 * | 11/2014 | Ellifson | F16F 9/0281 280/124.157 |
| 8,936,139 | B2 * | 1/2015 | Galasso | B60G 11/27 188/319.1 |
| 9,327,576 | B2 * | 5/2016 | Ellifson | F16K 1/00 |
| 10,000,145 | B2 | 6/2018 | Woods | |
| 10,029,758 | B2 | 7/2018 | McAndrews | |
| 10,093,145 | B1 | 10/2018 | Vaughan | |
| 10,399,406 | B2 | 9/2019 | Ahmadian | |
| 10,479,159 | B2 | 11/2019 | Gandhi | |
| 10,766,330 | B2 * | 9/2020 | Seto | B60G 17/0424 |
| 10,895,300 | B2 | 1/2021 | Dehlwes | |
| 10,900,538 | B2 | 1/2021 | Pniewski | |
| 11,529,836 | B1 * | 12/2022 | Schubart | B60G 17/018 |
| 2002/0175454 | A1 * | 11/2002 | Huang | F16F 9/0436 267/64.28 |

(Continued)

OTHER PUBLICATIONS

Wikimedia Commons, "File: Air Spring.JPG", dated Aug. 25, 2012, printed May 5, 2021, 3 pages.

*Primary Examiner* — Thomas W Irvin
(74) *Attorney, Agent, or Firm* — DANE IP Law PC

(57) ABSTRACT

An accumulator defines an accumulator volume that can be placed into communication with a spring chamber of a gas spring. A working volume of the gas spring is the sum of the spring chamber volume and the accumulator volume. The accumulator can be configured so that the accumulator volume can be selectively increased or decreased as desired, thus modifying performance of the associated gas spring.

15 Claims, 8 Drawing Sheets

(56) References Cited

U.S. PATENT DOCUMENTS

| | | | |
|---|---|---|---|
| 2003/0067103 A1* | 4/2003 | Easter | B60G 17/0528 267/64.11 |
| 2007/0137913 A1* | 6/2007 | Wohanka | B60G 15/12 180/197 |
| 2010/0230876 A1* | 9/2010 | Inoue | B60G 13/14 267/140.14 |
| 2012/0136537 A1* | 5/2012 | Galasso | F16F 9/3292 267/218 |
| 2013/0249175 A1* | 9/2013 | Ellifson | F16F 9/096 188/314 |
| 2015/0028529 A1* | 1/2015 | Ellifson | B60G 11/27 137/512 |
| 2019/0084365 A1* | 3/2019 | Oishi | B60G 17/0523 |
| 2019/0100070 A1* | 4/2019 | Ito | B60G 17/0525 |
| 2019/0263212 A1* | 8/2019 | Ito | B01D 53/26 |
| 2022/0032716 A1* | 2/2022 | Akcam | B60G 17/052 |
| 2022/0176764 A1* | 6/2022 | Mochizuki | B60G 13/14 |
| 2022/0194161 A1* | 6/2022 | Negishi | B60G 21/0556 |
| 2024/0125371 A1* | 4/2024 | Galasso | F16F 9/3292 |

* cited by examiner

ADJUSTABLE ACCUMULATOR FOR SELECTIVELY MODIFYING SPRING RATE OF GAS SPRING SYSTEM

BACKGROUND

The present disclosure relates to the field of pneumatic systems employing one or more gas springs.

A gas spring defines a chamber filled with pressurized gas. When a load is applied the gas spring, the load compresses the gas in the chamber until the gas pressure is sufficient to produce an equal opposing force to support the load. The pressurized gas thus functions similar to a mechanical spring such as a metal coil spring.

Gas springs differ from conventional mechanical springs, such as leaf or coil springs, in that a gas spring's spring rate is not linear over its operating range, while spring rates of mechanical springs generally are linear. This can make a significant difference. For example, using gas springs in a vehicle suspension system will result in a significantly different ride than would mechanical springs, and such a suspension would have great resistance to bottoming out due to particularly dramatic bumps. Also, some gas springs allow gas to be added to the chamber to increase or decrease spring height as desired, enabling a vehicle suspension system to have an adjustable ride height.

However, dealing with the non-linear spring rate behavior of gas springs can be challenging and the non-linear spring rate behavior may not provide desired performance in some situations.

SUMMARY

The present disclosure discloses aspects that improve the adjustability and performance of gas springs, and enable adjustment of the spring rate of gas springs. An accumulator encloses a volume of gas. This accumulator volume can selectively be placed in communication with a gas spring chamber so as to increase the working volume of the gas spring chamber, which will correspondingly change the spring rate behavior of the gas spring. The accumulator can be configured so that its accumulator volume can be changed as desired, thus enabling adjustment of the spring rate behavior of the gas spring. These concepts can be applied to systems having multiple gas springs, and even multiple accumulators.

This disclosure presents a gas spring system comprising a gas spring configured to enclose a spring chamber and having a first mount and a second mount. The spring chamber can define a spring chamber volume therewithin. The gas spring can be configured so that when a baseline load is applied across the first mount and second mount, the gas spring is placed in a baseline configuration and the spring chamber volume is at a baseline spring chamber volume. An accumulator can comprise an accumulator chamber in fluid communication with the spring chamber so that a pressurized gas can flow between the spring chamber and the accumulator chamber. The accumulator chamber can define an accumulator volume, and the accumulator can be configured so that the accumulator volume can selectively be changed. A working volume of the gas spring is the sum of the accumulator volume and the spring chamber volume. The accumulator can be configured so that changing of the accumulator volume is independent of relative movement of the first and second mounts of the gas spring.

In some variations the accumulator can comprise a piston, and movement of the piston can change the accumulator volume. The accumulator can comprise an actuator configured to selectively move the piston when the actuator is actuated. In some variation the actuator can be configured to be actuated by application of force external of the accumulator or gas spring.

In some variations, when the accumulator is configured to have a first accumulator volume, a plot of the spring rate of the gas spring versus a change in spring chamber volume will follow a first curve, and when the accumulator is configured to have a second accumulator volume, a plot of the spring rate of the gas spring versus a change in spring chamber volume will follow a second curve.

In additional variations, the gas spring can be configured so that when a second load is applied to the gas spring, the gas spring volume changes from the baseline gas spring volume to a second gas spring volume, and the accumulator can be configured so that when the second load is applied to the gas spring the accumulator volume remains the same.

In yet additional variations, the accumulator can comprise an actuator configured to change the accumulator volume upon application of an external actuating force that is unrelated to a load across the first mount and second mount of the gas spring.

In still additional variations the accumulator can be formed separately from the gas spring, and a gas passage can connect the accumulator volume with the spring chamber volume.

Yet an additional variation can additionally comprise a valve interposed in the gas passage. The valve can be configured to operate between an open position in which gas communicates freely through the gas passage between the accumulator chamber and the spring chamber, and a closed position in which gas is stopped from communicating through the gas passage between the accumulator chamber and the spring chamber.

In some such variations, a restricted-flow passage can be configured to equalize gas pressure between the spring chamber and the accumulator chamber when the valve is in the closed position. The restricted-flow passage can be configured to restrict gas flow sufficiently that the accumulator volume is not included in the working volume when the valve is in the closed position.

Some variations can additionally comprise a source of pressurized gas configured to supply pressurized gas to both the spring chamber and the accumulator chamber.

In further variations an inlet passage and an outlet passage can each communicate the accumulator chamber with the spring chamber. An outlet valve can be disposed in the outlet passage, and an inlet valve can be disposed in the inlet passage. The outlet valve can be a check valve stopping gas from flowing to the accumulator chamber. The inlet valve can be a check valve stopping gas from flowing from the accumulator chamber.

In yet further variations, an inlet passage and an outlet passage each can communicate the accumulator chamber with the spring chamber, and a flow control valve can be disposed in the outlet passage. The flow control valve can be configured to restrict a gas flow rate from the accumulator chamber to the spring chamber.

The present disclosure also presents a method of changing the spring rate characteristics of a gas spring system that defines a working chamber system that defines a working volume of pressurized gas compressed to a load pressure when a load is applied between a first mount and a second mount of the gas spring system. The method can include increasing the working volume of the working chamber system, and increasing a mass of pressurized gas in the working chamber system so that the pressurized gas is compressed to the load pressure when the load is applied between the first mount and the second mount of the gas spring system.

In some variations the gas spring system can comprise a gas spring having a spring chamber defining a spring chamber volume and an accumulator having an accumulator chamber defining an accumulator volume. Increasing the working volume of the working chamber system can comprise increasing the accumulator volume while keeping the spring chamber volume constant.

In additional variations, the gas spring system can be configured so that when the load changes, the spring chamber volume changes but the accumulator volume does not change.

Yet additional variations can additionally comprise an electronic control unit that can signal an actuator to change the accumulator volume in response to input received by the electronic control unit.

In further variations, the gas spring system can comprise a gas spring having a spring chamber, and increasing the working volume of the working chamber system can comprise placing the spring chamber into communication with an accumulator chamber of a separately-formed accumulator.

In yet further variations, an air passage can extend from the spring chamber to the accumulator chamber and a valve can be disposed in the air passage.

In still further variations, the gas spring system can comprise a gas spring having a spring chamber, and increasing the working volume of the working chamber system can comprise placing the spring chamber into communication with one or more accumulator chambers of one or more separately-formed accumulators.

The present disclosure further discloses a method of changing the spring rate characteristics of a gas spring that defines a spring chamber filled with a pressurized gas and having a spring chamber volume. The method can comprise providing an accumulator that defines an accumulator chamber disposed in a first configuration having a first accumulator volume. The accumulator chamber can communicate with the spring chamber via a gas passage so that a pressure of pressurized gas within the accumulator chamber and spring chamber is substantially equal. The method can include changing the accumulator to a second configuration in which the accumulator chamber defines a second accumulator volume that is different than the first accumulator volume. The method can further include changing the mass of gas within the accumulator chamber and spring chamber so that the pressure of pressurized gas is the same when the accumulator is in the second configuration as it was when the accumulator was in the first configuration.

DESCRIPTION

The present disclosure discloses aspects that improve the adjustability and performance of gas springs, and enable adjustment of the spring rate of gas springs. As will be discussed in more detail below, an accumulator encloses a volume of gas. This accumulator can selectively be placed in communication with a gas spring. The combination of an accumulator volume of the accumulator and the spring volume of the gas spring defines a working volume. When the accumulator is in fluid communication with the gas spring, the working volume of the gas spring increases, which will correspondingly change the spring rate behavior of the gas spring. The working volume can also be changed by making the accumulator adjustable so that the accumulator volume can be increased or decreased to change the working volume of the gas spring. Moreover, the fluid communication between the accumulator and the gas spring can be selectively cut off so that the working volume of the gas spring is solely the spring volume.

Figure 1A:
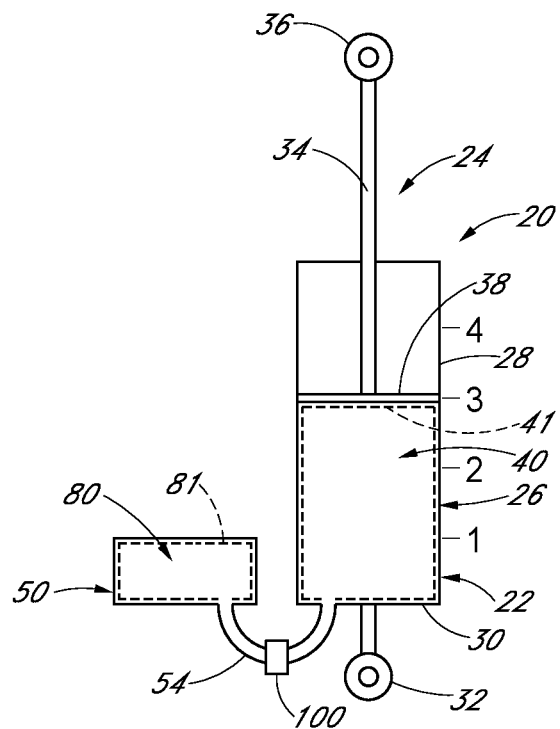
FIG. 1A is a schematic view of a gas spring in communication with an accumulator.

With initial reference to FIG. 1A, a schematic representation of a gas spring 20 in fluid communication with an accumulator 50 is shown. The illustrated gas spring 20 is a "gas cylinder" style. As shown, the gas spring 20 may have a first portion 22 and a second portion 24. The first portion 22 may comprise an elongated hollow cylinder 26 having an elongated side wall 28 and an end wall 30, and may be connected to a first mount 32. The second portion 24 may comprise an elongated rod 34 terminating at a second mount 36 on one end and a piston 38 on the opposite end. The piston 38 fits within the hollow cylinder 26 and includes a sealing structure so that the piston 38 sealingly engages the side wall 28 of the hollow cylinder 26. A spring chamber 40 is defined within the cylinder 26 between the piston 38, side wall 28, and end wall 30. The spring chamber 40 defines a spring chamber volume 41. A compressible fluid, typically a gas such as air or nitrogen, is enclosed within the spring chamber. The accumulator 50 can enclose an accumulator chamber 80 defining an accumulator volume 81 therewithin. A connector passage 54 (i.e., fluid line) can place the accumulator chamber 80 in fluid communication with the spring chamber 40. A valve 100 can be placed in the connector passage 54 to selectively cut off communication between the accumulator 50 and gas spring 20.

Figure 1B:
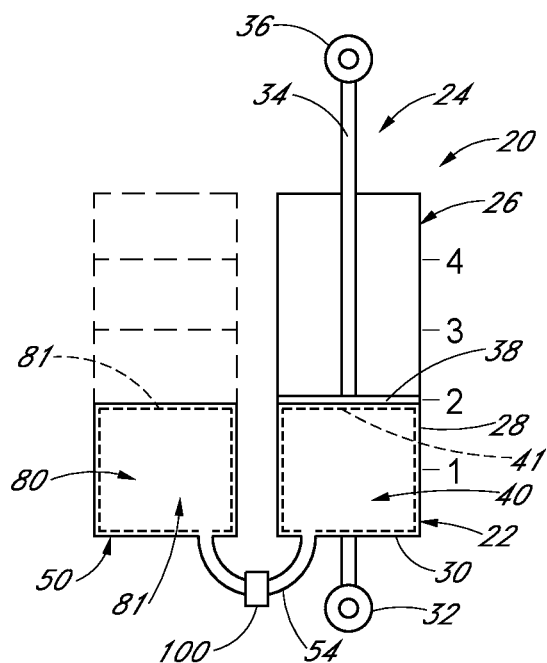
FIG. 1B is a schematic view of a gas spring in communication with another accumulator, and depicting further variations of accumulator structure in phantom.

With additional reference to FIG. 1B, when the second mount 36 moves relative to the first mount 32, the piston 38 correspondingly moves relative to the cylinder 26, such as from the position marked 4 (see FIG. 1A) to the position marked 2 (see FIG. 1B). Such relative movement correspondingly varies the spring chamber volume 41 (see FIG. 4), such that the spring chamber volume 41 when the piston 38 is positioned as in FIG. 1B is smaller than when the piston 38 is positioned as in FIG. 1A. When the fluid communication between the accumulator 50 and the gas spring 20 is cut off and the spring chamber volume 41 decreases, the pressure of the gas in the gas spring increases since the mass of the gas within the spring chamber 40 is the same in both positions.

The gas pressure is applied to the entire inner surface of the spring chamber 40. When fluid communication with the accumulator is closed, the piston 38 defines the only surface of the spring chamber 40 that is movable. The gas within the spring chamber 40 thus pushes on the piston with a force equal to the pressure multiplied by the surface area, or working area, of the piston. This force tends to push the piston 38 outwardly in opposition to a load applied between the first and second mounts 32, 36, resulting in operation as a spring.

In the arrangement illustrated in FIGS. 1A-1B, a working volume of the spring 20 is defined as the sum of the spring chamber volume 41 and the accumulator volume 81. The working volume of the gas spring 20 can be adjusted to adjust the spring rate or performance of the gas spring 20. The connector passage 54 can be cut off or closed by the valve 100 so that the gas spring 20 works like a typical gas spring. In this example, the working volume is equal to the spring chamber volume 41. Alternatively, the connector passage 54 can be selectively opened so that the gas spring 20 has a lower spring rate compared to when the connector passage 54 is closed. In this example, the working volume is equal to the spring chamber volume 41 and the accumulator volume 81. The performance of the gas spring 20 can further be adjusted by allowing of the adjustment (i.e., increasing or decreasing) of the accumulator volume 81. Opening and closing of the connector passage 54 and adjustment of the volume of the accumulator volume 81 can be accomplished manually such as by direct manipulation or via one or more remote actuators, or automatically through a computer which determines the then current environmental condition of the vehicle and signals actuators to operate accordingly.

In order to demonstrate the effect of varying the working volume, an example will use the schematic gas spring 20 of FIGS. 1A-1B with the assumption that the piston 38 has a diameter of 5 inches and operates over a range of 4 inches within the cylinder 26. The labels 4, 3, 2 and 1, then, refer to a distance (or height) from the end wall 30 of the cylinder 26. In the illustrated embodiment, a baseline configuration will be with the piston 38 positioned at 4 inches (as shown in FIG. 1A) and a baseline gas being air pressurized at a baseline pressure of 100 psi to support a baseline load. The term "baseline" is here used to indicate a starting point for calculations. In this particular instance the "baseline" configuration is an at-rest, static condition in which a known static load is applied to the spring.

In a first example, the example assumptions will be applied to a gas spring having no accumulator (i.e., connector passage 54 is closed). Since the accumulator is not connected to the gas spring, the working volume is equal to the spring chamber volume 41. Table 1 presents calculations of certain performance characteristics of such a gas spring. In Table 1, calculations are presented showing various aspects when the piston 38 is positioned at the baseline position (i.e., a height of 4 in.), as well as when the spring is compressed to depress the piston 38 to heights of 3 in., 2 in., and 1 in. "Volume" is the working volume of the spring at the corresponding height, and "% Base Vol" demonstrates the proportion of the working volume at the corresponding height relative to the baseline working volume. "Pressure" denotes the pressure of gas within the working volume, and "Force" is the force being exerted on the piston 38. The "Spring Rate" is the spring rate of the gas spring as calculated at the corresponding height.

TABLE 1

5 in. diameter piston; 4 in. cylinder;
100 psi baseline pressure; no accumulation

| Height (in.) | Volume (in.³) | % Base Vol. | Pressure (psi) | Force (lb.) | Spring Rate (lb./in.) |
|---|---|---|---|---|---|
| 4 | 78.5 | 100 | 100 | 1962.50 | |
| 3 | 58.88 | 75 | 133.33 | 2616.67 | 654.17 |
| 2 | 39.25 | 50 | 200 | 3925 | 1308.33 |
| 1 | 19.63 | 25 | 400 | 7850 | 3925 |

Table 2, below, presents an example when the connector passage 54 is opened to establish fluid communication between the accumulator 50 and the gas spring 20. In this specific example, the accumulator volume 81 is equal to 25% of the baseline spring chamber volume (i.e., the spring chamber volume 41 when the piston is at a height of 4 in.). As such, the baseline working volume of the gas spring when the fluid connector 54 is opened is 125% of the baseline spring chamber volume 41. As shown in Table 2, the spring rate is not constant as the spring is depressed. The spring rate increases as the spring is depressed.

TABLE 2

5 in. diameter piston; 4 in. cylinder;
100 psi baseline pressure; 25% accumulation (19.62 in.³)

| Height (in.) | Volume (in.³) | % Base Vol. | Pressure (psi) | Force (lb.) | Spring Rate (lb./in.) |
|---|---|---|---|---|---|
| 4 | 98.12 | 100 | 100 | 1962.5 | |
| 3 | 78.5 | 80 | 125 | 2453.16 | 490.66 |
| 2 | 58.87 | 60 | 166.67 | 3270.94 | 817.79 |
| 1 | 39.25 | 40 | 250.02 | 4906.63 | 1635.68 |

Table 3 illustrates the performance of a gas spring 20 in fluid communication with the accumulator 50 wherein the accumulator 50 defines an accumulator volume 81 that is 50% of the baseline spring chamber volume 41. In ghost lines FIG. 1B depicts additional variations of accumulators having accumulator volumes that are 75%, 100% and even 125% of the baseline spring chamber volume. Table 3 illustrates that like Table 2, the spring rate increases but at a lower rate.

TABLE 3

5 in. diameter piston; 4 in. cylinder;
100 psi baseline pressure; 50% accumulation (39.25 in.³)

| Height (in.) | Volume (in.³) | % Base Vol. | Pressure (psi) | Force (lb.) | Spring Rate (lb./in.) |
|---|---|---|---|---|---|
| 4 | 117.75 | 100 | 100 | 1962.50 | |
| 3 | 98.13 | 83.33 | 120 | 2355 | 392.5 |
| 2 | 78.5 | 66.67 | 150 | 2943.75 | 588.75 |
| 1 | 58.88 | 50 | 200 | 3925 | 981.25 |

Table 4, below, presents an example in which the accumulator 50 has an accumulator volume 81 equal to 75% of the baseline spring chamber volume. As such, the baseline working volume is 175% that of the baseline spring chamber volume 41. Table 4 illustrates that the spring rate increases at an even slower rate compared to the examples above.

TABLE 4

5 in. diameter piston; 4 in. cylinder;
100 psi baseline pressure; 75% accumulation (58.88 in.$^3$)

| Height (in.) | Volume (in.$^3$) | % Base Vol. | Pressure (psi) | Force (lb.) | Spring Rate (lb./in.) |
|---|---|---|---|---|---|
| 4 | 137.38 | 100 | 100 | 1962.50 | |
| 3 | 117.76 | 85.71 | 116.67 | 2289.57 | 327.07 |
| 2 | 98.13 | 71.43 | 140 | 2747.46 | 457.89 |
| 1 | 78.51 | 57.14 | 175 | 3434.28 | 686.82 |

Table 5, below, presents an example in which the accumulator 50 has an accumulator volume 81 equal to 100% of the baseline spring chamber volume 41. As such, the baseline working volume is 200% that of the baseline spring chamber volume. Table 5 illustrates that the spring rate increases at an even slower rate compared to the examples above.

TABLE 5

5 in. diameter piston; 4 in. cylinder;
100 psi baseline pressure; 100% accumulation (78.50 in.$^3$)

| Height (in.) | Volume (in.$^3$) | % Base Vol. | Pressure (psi) | Force (lb.) | Spring Rate (lb./in.) |
|---|---|---|---|---|---|
| 4 | 157 | 100 | 100 | 1962.5 | |
| 3 | 137.38 | 87.5 | 114.29 | 2242.86 | 280.36 |
| 2 | 117.75 | 75 | 133.33 | 2616.67 | 373.81 |
| 1 | 98.13 | 62.5 | 160 | 3140 | 523.33 |

By selectively connecting the accumulator to the gas spring, the performance (i.e., spring rate as a function of deflection) can be adjusted. Also, by adjusting the accumulator volume which is in fluid communication with the gas spring chamber volume, the performance can be further adjusted. Notably, in each of these examples, the gas spring 20 itself is unchanged, but the adjustable accumulator 50 changes the working volume of the gas spring 20, and correspondingly changes spring performance.

Figure 2:
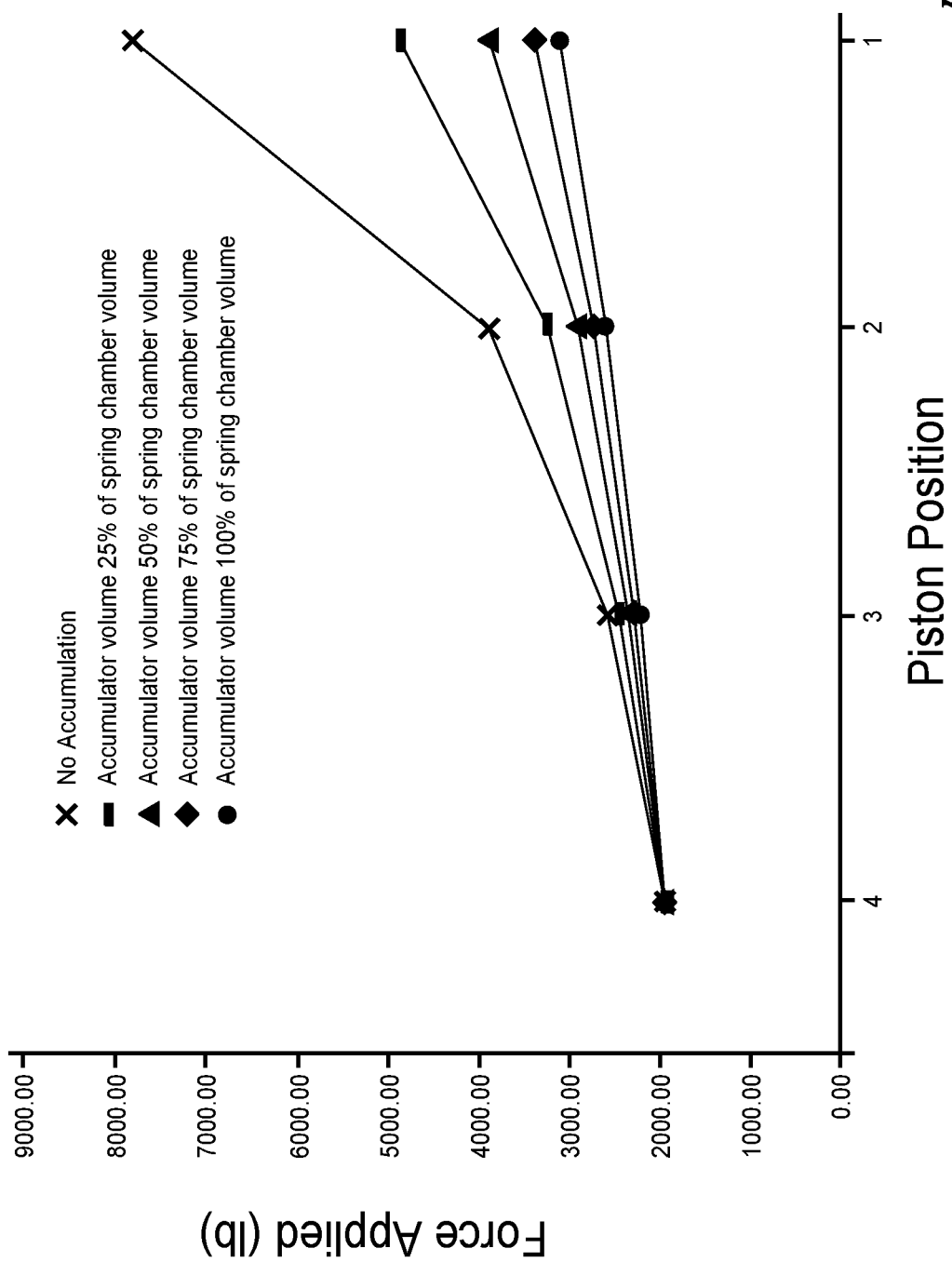
FIG. 2 is a collection of plots of force applied versus piston position for a gas spring, each plot depicting the gas spring combined with a differently-sized accumulator.
Figure 3:
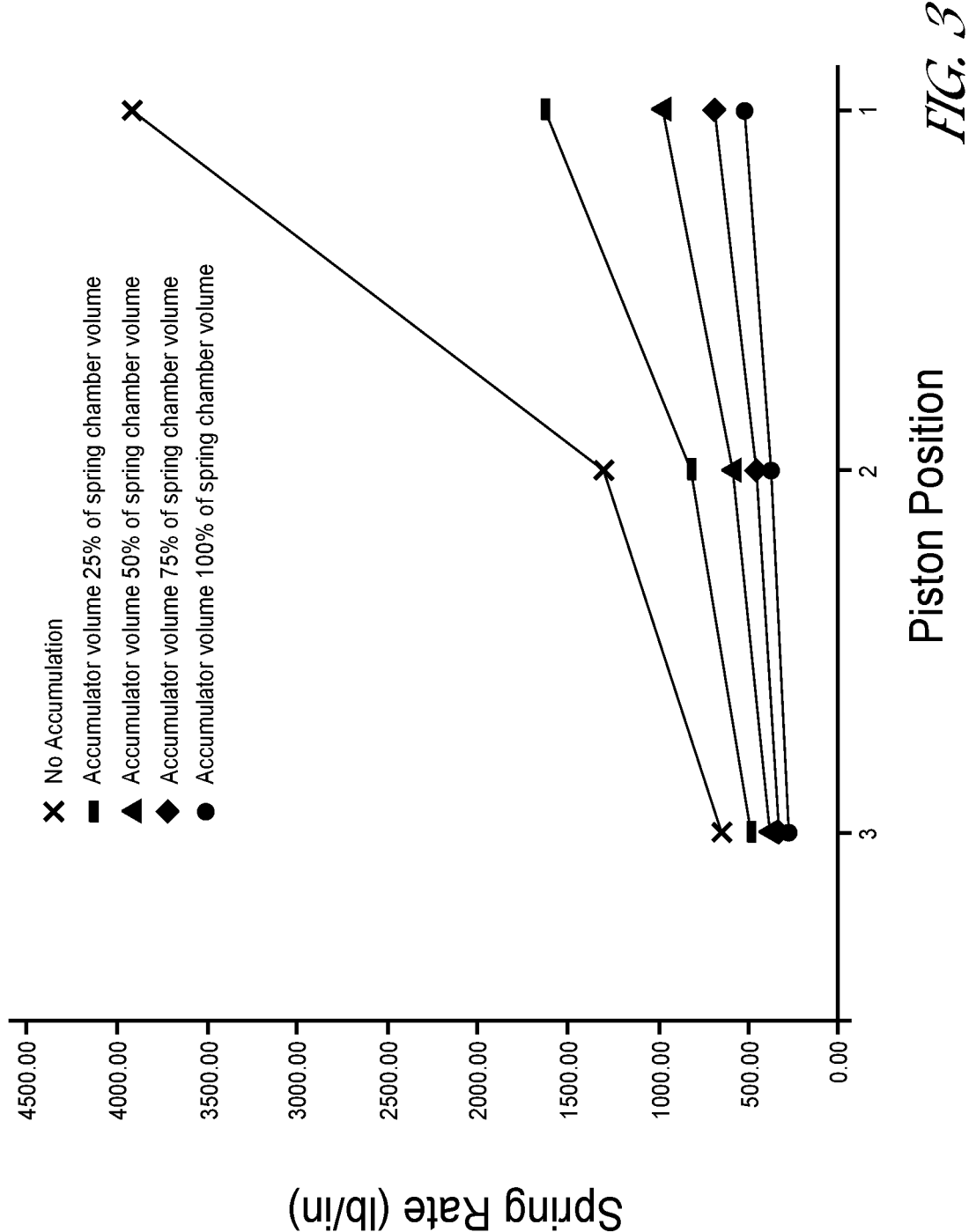
FIG. 3 is a collection of plots of spring rate versus piston position for a gas spring, each plot depicting the gas spring combined with a differently-sized accumulator.

FIGS. 2 and 3 illustrate how the performance of the gas spring 20 can be adjusted by selectively connecting the accumulator (without accumulator versus with accumulator) and also be adjusting the accumulator volume to be different percentages of the spring chamber volume.

With reference next to FIG. 2, which is a plot of the force on the piston versus the piston position for the above examples, it can be seen that—in all examples—as the piston moves from the 4" height to the 1" height, the force applied by the pressurized gas increases. This force increase is not linear. The force increases exponentially as the gas is increasingly compressed. However, when the baseline working volume is increased, the rate at which spring force increases with increasing displacement is lower. As such, the change in slope of the plot corresponding to 25% accumulation is less than the change in slope of the plot corresponding to no accumulation.

With additional reference to FIG. 3, which is a plot of the spring rate of the gas spring versus the piston position for the above examples, it can be seen that—in all examples—as the piston moves from the 4" height to the 1" height, the spring rate increases. Also, this spring rate increase is not linear. The spring rate increases exponentially as the gas is increasingly compressed. However, when the baseline working volume is increased, the rate of spring rate increase with piston movement (i.e., depression) is lower. As such, the change in slope of the plot corresponding to 50% accumulation line is less than the change in slope of the plot corresponding to 25% accumulation.

Notably, FIGS. 2 and 3 plot only specific positions. Although straight lines have been drawn to better visualize the performance changes, in practice these lines would each follow a function curve specific to the corresponding example.

Tables 1-5 and FIGS. 2-3 demonstrate that varying the baseline working volume of a gas spring 50—with all other aspects of the spring being kept constant—can work a dramatic change in the performance of the gas spring. Specifically, increasing the baseline working volume can dramatically reduce both the spring rate specifically and the rate at which the spring rate increases with compression of the spring—and the gas therewithin—as the gas spring is deflected during use. Conversely, decreasing the baseline working volume dramatically increases the rate at which the force increases with compression of the gas spring as the piston of the gas spring is deflected during use. Thus, increasing the baseline working volume of the gas spring 20 changes the performance of the gas spring, making it softer, particularly when approaching the limits of its operational range.

The gas spring shown schematically in FIGS. 1A-B is an air cylinder. It is to be understood that there are many types and configurations of gas springs. For example, in vehicle suspensions, an air bag may be utilized, which does not necessarily use a traditional piston, and may include a rubber-based side wall combined with a textile. Air bags themselves have various styles as well. For example, a style of air bag is referred to as a convoluted air bag, typically having two convolutes one above the other, but sometimes having one, three, or more convolutes. Another style of air bag is referred to as a tapered sleeve air bag, in which a bottom portion of the bag can tuck inside the top portion as the bag compresses. Regardless of the style, whether air bag, air cylinder, or another configuration, structures constructed and intended to take advantage of air or other gas pressure to provide a spring effect are to be included within the definition of gas spring as used herein. Also, due to their differences in structure and flexibility, calculations comparable to those as presented in Tables 1-5 above may be somewhat different for air bags than for the illustrated air cylinders. However, the same patterns and principles will apply for all gas springs. Specifically, both force exerted and spring rate will increase exponentially as the gas is compressed when the applied load increases, and increasing the working volume will decrease such rates of increase of both force and spring rate.

Figure 4:
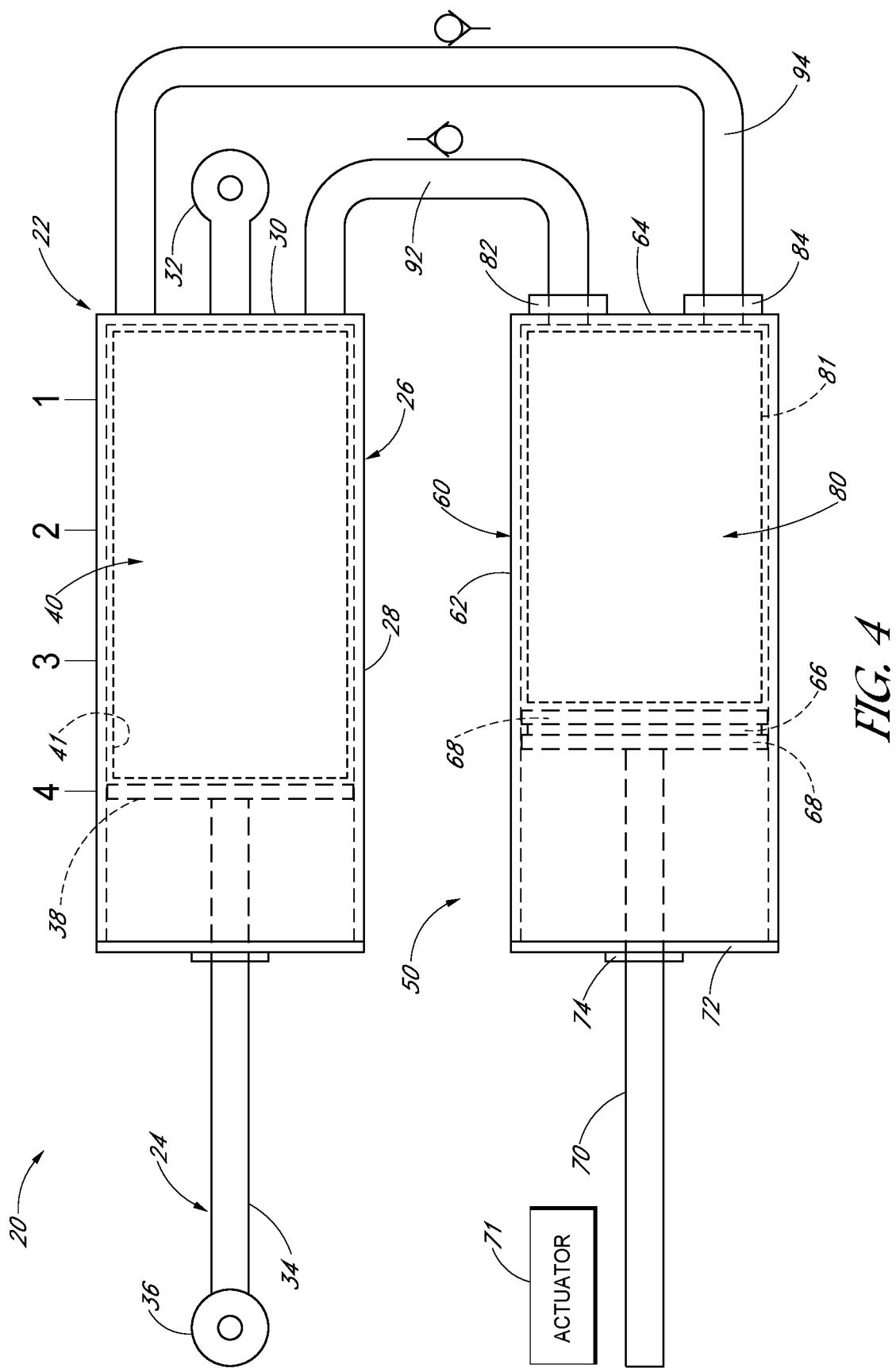
FIG. 4 is a schematic view of an embodiment of a variable-volume accumulator in communication with a gas spring.

With reference next to FIG. 4, an embodiment of a variable volume accumulator 50 is shown along with a schematic representation of a gas spring 20. The illustrated accumulator 50 can include a body 60, which can be an elongated hollow cylinder having a side wall 62 and an end wall 64. A piston 66 can be disposed within the body 60 and can include seals 68 configured to sealingly engage the side wall 62. An elongated threaded rod 70 can extend from the piston 66 and out of the body 60. A support 72 can be attached to the body 60 and can include a threaded interface 74 through which the threaded rod 70 can extend. As such, as the threaded rod 70 is rotated the piston 66 can be advanced or retracted depending on the direction of rotation. It is to be understood that variations can be provided in which the threaded rod 70 can be rotated manually by hand or wrench or can be rotated by a motorized actuator 71. The actuator 71 may be computer controlled.

An accumulator chamber 80 can be defined by the piston 66, side wall 62 and end wall 64. An accumulator volume 81 is defined by the accumulator chamber 80. A first port 82 and a second port 84 can be formed through the end wall 64, and first and second gas passages 92, 94 can connect the respective first and second ports 82, 84 to the spring chamber 40 of an associated gas spring 20. As such, the working volume of the gas spring 20 is the sum of the spring chamber volume 41 and the accumulator volume 81. In some variations, first gas passage 92 may allow gas to pass from the gas spring to the accumulator but not the other way due to a first one way valve. Second gas passage 94 may allow gas to pass from the accumulator to the gas spring but not the other way due to a second one way valve.

With continued reference to FIG. 4, rotating the threaded rod 70 changes the accumulator volume 81 defined by the accumulator chamber 80. And since the accumulator chamber 80 is in communication with the spring chamber 40 of the gas spring 20, the working volume of the gas spring 20 is the sum of the spring chamber volume 41 and the accumulator volume 81. As such, rotating the threaded rod 70 changes the working volume of the gas spring 20 and thus the performance of the spring 20. In this variation, a user can selectively change (i.e., manually or through actuator 71) the accumulator volume 81 of the accumulator 50 in order to change the performance of the corresponding gas spring 20 without making any changes to the gas spring 20 itself. As noted above, during spring operation, the spring chamber volume 41 changes as the applied load compresses and decompresses the gas in the working volume. However, the accumulator volume 81 only changes if and when the threaded rod 70 is actuated, and changing the accumulator volume 81 can be independent of application of load to the gas spring 20.

Figure 5:
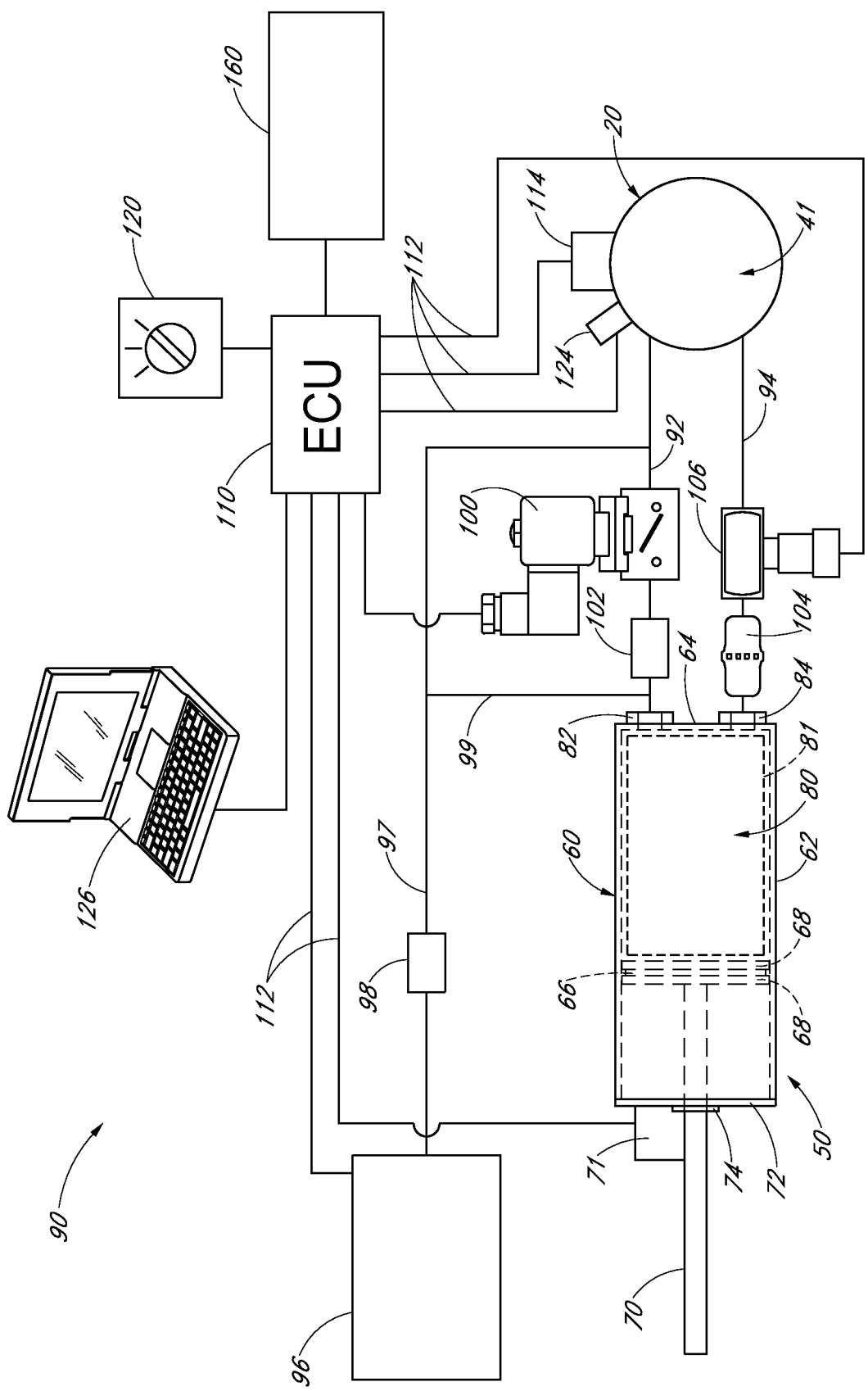
FIG. 5 is a schematic representation of a pneumatic system including a variable-volume accumulator, a gas spring, and other components.

With reference next to FIG. 5, a pneumatic system 90 is presented schematically. The system can include an air spring 20 in communication with an accumulator 40 through the first gas passage 92, which can be an inlet gas passage, and the second gas passage 94, which can be an outlet gas passage. The inlet gas passage 92 can attach to the first port 92 of the accumulator 50, which can be an inlet port, and the outlet gas passage 94 can attach to the second port 94 of the accumulator 50, which can be an outlet port. A pressurized gas source 96 can supply pressurized gas to the gas spring 20 and accumulator 50 via a gas supply passage 97. A supply check valve 98 can be provided and configured to allow the gas source 96 to supply gas to the air spring 20 and accumulator 50 while preventing gas from flowing back to the supply 96 when the spring 20 is pressurized during use. The pressurized gas source 96 can include various structures and configurations. For example, the pressurized gas source 96 can include one or more compressors, such as air compressors, and/or holding tanks.

As illustrated, a solenoid valve 100 can be provided in the gas inlet passage 92 between the spring 20 and the accumulator 50. The solenoid valve 100 thus can determine whether the working volume of the gas spring 20 is to include the accumulator volume 81 or not. More specifically, when the solenoid valve 100 is closed, the accumulator chamber 80 is cut off from the fluid communication with the gas spring chamber 40. As such, the working volume of the gas spring 20 is limited to the spring chamber volume 41. When the solenoid valve 100 is open, the accumulator chamber 80 is placed in fluid communication with the gas spring chamber 40, and thus, the working volume of the gas spring 20 includes both the spring chamber volume 41 and the accumulator volume 81.

An inlet check valve 102 can also be provided in the gas inlet passage 92. The inlet check valve 102 can be configured to allow gas to flow along the inlet passage 92 from the gas spring to the accumulator inlet port 82, but not from the inlet port 82 to the gas spring 20. In another variation, the inlet check valve 102 can be configured to not allow flow below a selected threshold pressure, but allow flow above the threshold pressure. Thus, in such a variation, when the gas spring 20 operates below the threshold pressure, it is cut off from communication with the accumulator 50, and the working volume is limited to the spring chamber volume 41. But when the pressure within the spring chamber 40 exceeds the threshold pressure, the inlet check valve 102 opens, placing the gas spring 20 in communication with the accumulator 50 so that the working volume includes both the spring chamber volume 41 and the accumulator volume 81. Thus, the gas spring 20 can operate in conformance with one behavior curve (see FIGS. 2 and 3) when below the threshold pressure, and operate in conformance with another behavior curve when above the threshold pressure.

A reduced-flow gas passage 99 can be provided communicating with the inlet passage 92 downstream of the solenoid valve 100. The reduced-flow gas passage 99 can communicate with the gas supply passage 97, gas spring 20, and/or the inlet passage 92 upstream of the solenoid valve 100. As such, even when the solenoid valve 100 is closed, the gas pressure can equalize between the gas spring 20 and the accumulator 50. Preferably the reduced-flow gas passage 99 is configured so that pressure equalization between the gas spring 20 and the accumulator 50 can be achieved when loads are static, but gas flow is restricted through the passage 99 so that, during rapidly-changing dynamic loads, little or no gas flows through the reduced-flow gas passage 99 and, as a practical matter, the system behaves as if the reduced-flow gas passage 99 was closed by a valve.

For example, in a variation in which a pneumatic system as depicted in FIG. 5 is employed in a vehicle suspension, the input and output passages 92, 94, can each be expected to have an internal diameter of about 0.25 inch to about 0.5 inch so that gas can flow between the gas spring 20 and accumulator 50 without substantial restriction, and the reduced-flow passage 99 can be expected to have a restriction of about 0% to 100% so that gas flow between the gas spring 20 and accumulator 50 through the reduced-flow passage 99 will not be substantial during rapidly-changing dynamic loads that are applied for short-terms such as about 0.006 to about 2 seconds. As such, the reduced-flow gas passage 99 is sized and configured so that, when the valve 100 has cut off communication through the inlet passage 92, gas pressure can equalize between the gas spring 20 and accumulator 80 during long-term static loads but not during short-term, rapidly-changing dynamic loads. Thus, notwithstanding the presence of the reduced-flow gas passage 99, during operation with dynamic loads when the valve 100 is closed, the working volume of the spring 20 is limited to the spring chamber volume 41, and does not include the accumulator volume 81.

With continued reference to FIG. 5, an outlet check valve 104 can be provided in the outlet passage 94 between the outlet port 84 and the gas spring 20. The outlet check valve 104 can be configured to allow flow only from the accumulator 50 to the gas spring 20. As such, during use, gas from the gas spring 20 flows to the accumulator 50 through only the inlet passage 92 and from the accumulator 50 to the gas spring 20 through only the outlet passage 94. Also, a flow control valve 106 can be provided in the outlet passage 94 and configured to limit the speed of gas flowing therethrough. As such, the flow control valve 106, by limiting the speed at which gas from the accumulator 50 returns to the gas spring 20, can reduce the rate of rebound of the spring 20 during operation. In some variations, the flow control valve 106 can be adjusted as desired to limit flow so as to achieve a desired rebound rate.

The pneumatic system 90 can include electronic control of one or more components. As illustrated, an electronic control unit (ECU) 110 can be connected, via data/power lines 112 to one or more components of the pneumatic system 90 so as to control such components and improve system performance. The ECU 110 can signal the solenoid valve 100 when to actuate, and can be configured to direct adjustment of the flow control valve 106. The ECU 110 can also be configured to control the accumulator volume 81. The accumulator 50 can include the actuator 71 controlled by the ECU 110 and configured to advance or retract the piston 66, thus changing the accumulator volume 81 as desired, and as signaled by the ECU 110. The gas spring 20 can include a pressure release valve 124 whose operation is controlled by the ECU 110, enabling quick reduction of gas mass within the gas spring 20 when determined necessary by the ECU 110.

The ECU 110 can be configured to receive inputs from components such as one or more spring sensors 114, which can measure aspects of the gas spring 20 such as its position (height) and/or gas pressure. Other data sources 116 can also supply information to the ECU 110 from sources such as other sensors (such as a vehicle's attitude, accelerometer, suspension position, g force, pitch and yaw sensors), other controllers (such as a vehicle's ECU), or the like. The ECU 110 can also be configured to communicate with an external computing device 126, both sending data such as uploading saved performance tracking data, and receiving data such as revisions to control algorithms.

A selector 120 can be provided and configured to enable a user to select a particular setting corresponding to certain parameters or desired performance characteristics and/or to manually control certain aspects. Such a selector can take any of multiple forms as desired. For example, the selector can include a switch that rotates between discrete or contiguous settings, and/or can include one or more buttons. User inputs from the selector 120, as well as data received by the ECU 110 from other sources, can be considered when controlling various components. Also, some selector inputs may override a control algorithm that may have been calculated by the ECU 110, as desired, such as to actuate the actuator 71 or open/close the valve 100 as directed by a user rather than a control algorithm.

In a variation of a pneumatic system 90 employed as part of the suspension of a vehicle, selection of a first setting by the selector 120 can signal a "sport" setting, in which the ECU 110 can signal the release valve 124 to release some gas from the spring chamber 40 so as to lower the vehicle body height. The ECU 110 can also send a signal the actuator 71 to decrease the accumulator volume 81 (screw in the piston 66 in the illustrated variation) so as to provide a firmer ride for the vehicle. Also, the ECU 110 can send a signal to the valve 100 to cut off flow to the accumulator 50 so that the working volume of the spring is limited to the spring chamber volume 41. A second setting of the selector 120 can signal a "comfort" setting, in which the ECU 110 can send a signal the actuator 71 to increase the accumulator volume 81 (screw out the piston 66 in the illustrated variation) so as to provide a softer ride for the vehicle. Also, the ECU 110 can send a signal to the valve 100 to open flow to the accumulator 50 so that the effective working volume of the spring is the combination of the spring chamber volume 41 and the accumulator volume 81.

The ECU 110 can also be configured to control components in real time based on data inputs. In a variation of a pneumatic system 90 employed as part of the suspension of an off road vehicle, a high-speed setting of the selector 120 can prompt the ECU 110 to control the actuator 71 to keep the accumulator volume 81 relatively large so as to soften up a potentially rough ride. However, if the vehicle were to make a jump, an excessively softly-sprung suspension is more liable to bottom out upon landing. Thus, the ECU 110 can be configured to recognize data from vehicle data sources suggesting that the vehicle is airborne, and upon recognizing that the vehicle is airborne the ECU 110 can trigger the solenoid valve 100 to close, taking the accumulator 50 out of communication with the gas spring 20, and thus reducing the working volume so that the spring rate will increase more rapidly so as to reduce the likelihood of bottoming out upon landing. The ECU 110 can be configured to signal the solenoid valve 100 to reopen upon determining that the vehicle has landed.

It is to be understood that many variations of control routines and algorithms can be employed to control the pneumatic system 90, and that pneumatic systems 90 having some or all of the components described herein can be employed in various forms and for various applications.

Figure 6A:
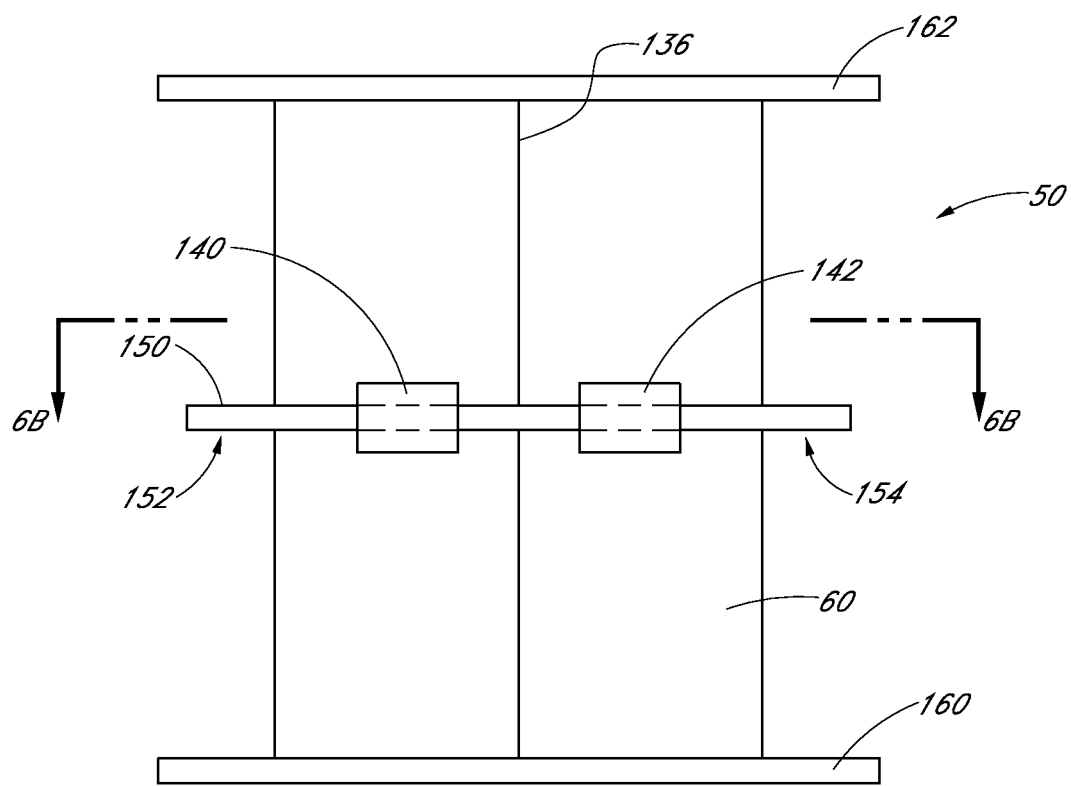
FIG. 6A is a side view of another embodiment of a variable-volume accumulator.
Figure 6B:
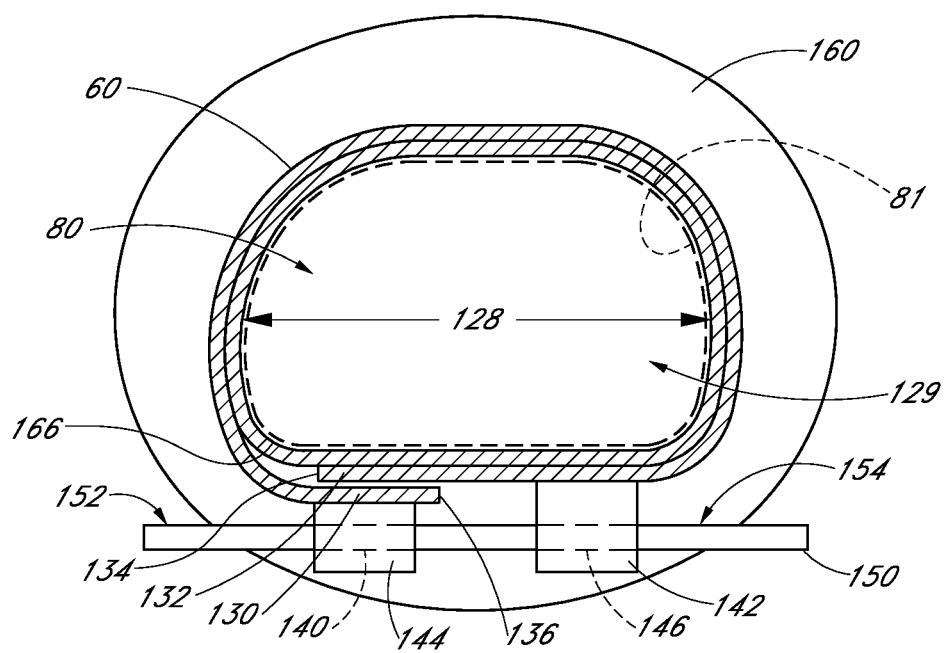
FIG. 6B is a sectional view taken along lines 6B-6B of FIG. 6A.

With reference next to FIGS. 6A and 6B, a variation of an accumulator 50 can have a tubular body 60 formed by a side wall 62 that is curved into a tubular shape having an inner diameter 128 and defining an internal space 129. In this configuration, an outer end portion 130 of the body 60 can overlap an inner end portion 132 so that an inner end 134 is adjacent an inner surface of the outer end portion 130, and an outer end 136 is adjacent an outer surface of the inner end portion 132.

An outer boss 140 can be attached to the outer end portion 130, and an inner boss 142 can be attached to the inner end portion 132. The outer boss 140 and inner boss 142 each can have a threaded hole 144, 146 formed therethrough, with the threads of the outer boss 140 being configured in a direction opposite those of the inner boss 140. An elongated rod 150 can extend through the threaded holes 144, 146 of both the outer boss 140 and the inner boss 142. A first portion 152 of the rod 150 can be threaded to match the outer boss 140 threads and a second portion 154 of the rod can be threaded to match the inner boss 142 threads. As such, rotation of the rod 150 in a first rotational direction can draw the outer and inner bosses 150, 152 closer together, and rotation of the rod 150 in a second rotational direction opposite the first rotational direction can push the outer and inner bosses 150, 152 farther apart. As the outer and inner bosses 150, 152 move relative to one another, the associated outer end portion 130 and inner end portion 132 also move relative to one another, thus changing the inner diameter 128 of the body 60.

A first end wall 160, or bottom wall, can be disposed at the bottom end of the body 60, and a second end wall 162, or top wall, can be disposed at the top end of the body 60. The first and second end walls 160, 162 can abut the body 60, but allow the side wall 62 to move relative thereto as the inner diameter 128 is changed. A bladder 166 can be disposed in the internal space 129. The bladder 166 can be configured to expand and contract, but its expansion will be constrained to the size of the internal space 129. The accumulator chamber 80 can be defined within the bladder 166. In this configuration, actuation of the rod 150 can increase or decrease the volume of the internal space 129, and thus the accumulator chamber 80, so that the accumulator 50 has an adjustable accumulator volume 81.

Figure 7:
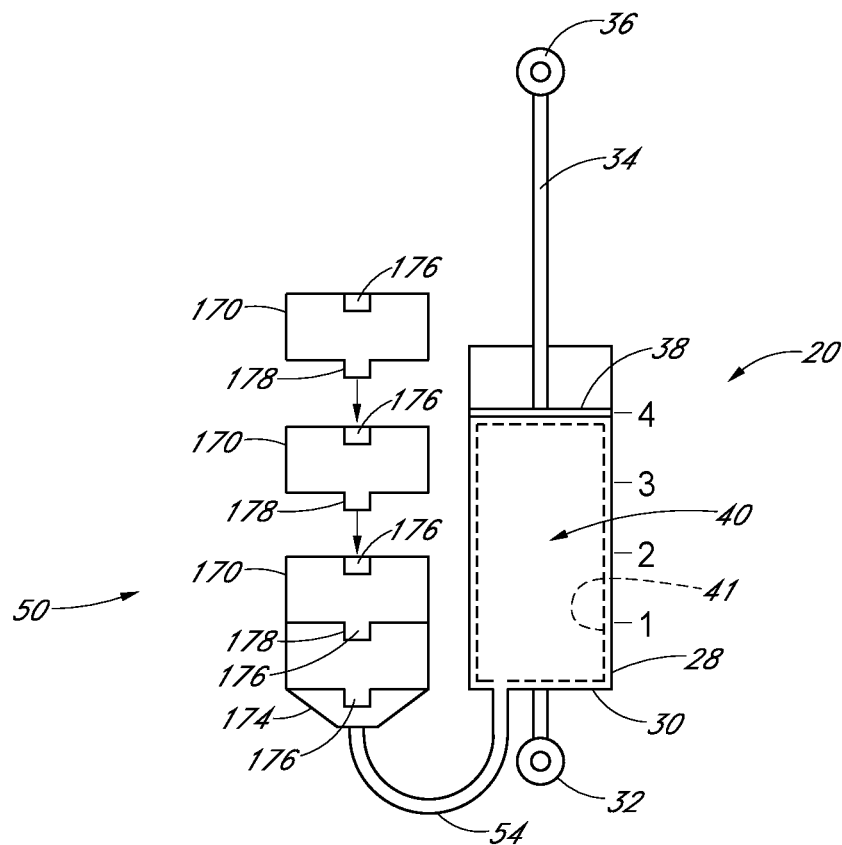
FIG. 7 is a schematic view of a variation of an accumulator in communication with a gas spring.

With reference next to FIG. 7, another variation of an accumulator 50 can include a plurality of accumulator modules 170, each of which can define a module chamber 172 having a module volume. A gas spring 20 can be attached to an accumulator mount 174. The accumulator mount 174 and each module 170 can have a receiver valve 176, and each module 170 can have a nub 178 configured to fit into a receiver valve 176 so that the receiver valve 176 is opened when the nub 178 is fitted therein. The nub 178 and receiver valve 176 can be threaded so that they are structurally attached when engaged with one another. Of course, other attachment structures can be employed as desired. When the receiver valve 176 is open, the engaged modules 170 are connected to one another so that the module chambers 172 collectively define a single chamber volume.

As depicted, a plurality of accumulator modules 170 can be employed, with the accumulator volume being defined by the collective volume of the engaged accumulator modules 170. In some variations, modules of different sizes, and thus different volumes, can be employed. A user can thus mix and match multiple accumulator modules 170 of different sizes to achieve a desired collective accumulator volume. If no accumulator 50 is desired, the accumulator mount 174 can be left with no module 170 attached, which accumulator mount 174 can be configured to provide very little or no significant accumulator volume. As desired, the accumulator mount 174 can also be configured to provide a significant basic accumulator volume.

Variations discussed above have described systems having a single accumulator 50 associated with a single gas spring 20. It is to be understood that a single accumulator 50 can be considered an "accumulator system". An accumulator system can also include a plurality of accumulators 50 that are interconnected and act collectively. Similarly, an accumulator system made up of one or more accumulators can communicate with a gas spring system having one or more gas springs 20 that are interconnected and act collectively. In such a system, the gas springs in the gas spring system can collectively share connection to the one or more accumulators of the accumulator system.

Figure 8:
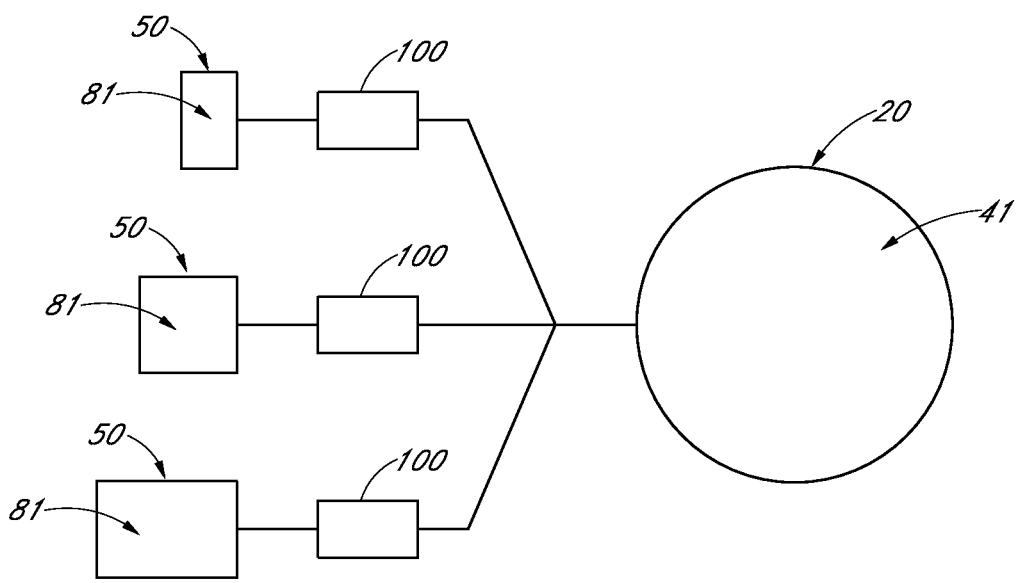
FIG. 8 is a schematic representation of an accumulator system in communication with a gas spring.

With reference next to FIG. 8, an accumulator system can include multiple accumulators 50. As shown, each accumulator 50 can define an accumulator chamber 80 having a fixed, unadjustable size. Also, each accumulator 50 can have a different size, and thus define a different accumulator volume. In some variations, one or more, or all, of the accumulators in an accumulator system can be the same size. Each of the accumulators 50 can be in communication with a gas spring 20, but can have such communication regulated by a dedicated solenoid valve 100, or other type of valve. As such, only accumulators 50 whose associated valves 100 are open are operational, and the system's accumulator volume is defined as the collective volume of the operational accumulators 50. The working volume of the gas spring 20, then, is the sum of the spring chamber volume 41 and the collective accumulator volume of the accumulators 50 whose associated solenoid valves 100 are open. As such, the system's accumulator volume can be adjusted by selectively opening the associated valves 100 of a collection of accumulators 50 that, collectively, define the desired accumulator volume. Such a configuration can be particularly advantageous for real-time, or split-second adjustments of the gas spring's 20 working volume, as the solenoid valves 100 can be selectively actuated by an ECU. Although the illustrated variation employs multiple accumulators 50 that each have a fixed accumulator volume 81, it is contemplated that additional variations can include one or more variable-volume accumulators 50.

Figure 9:
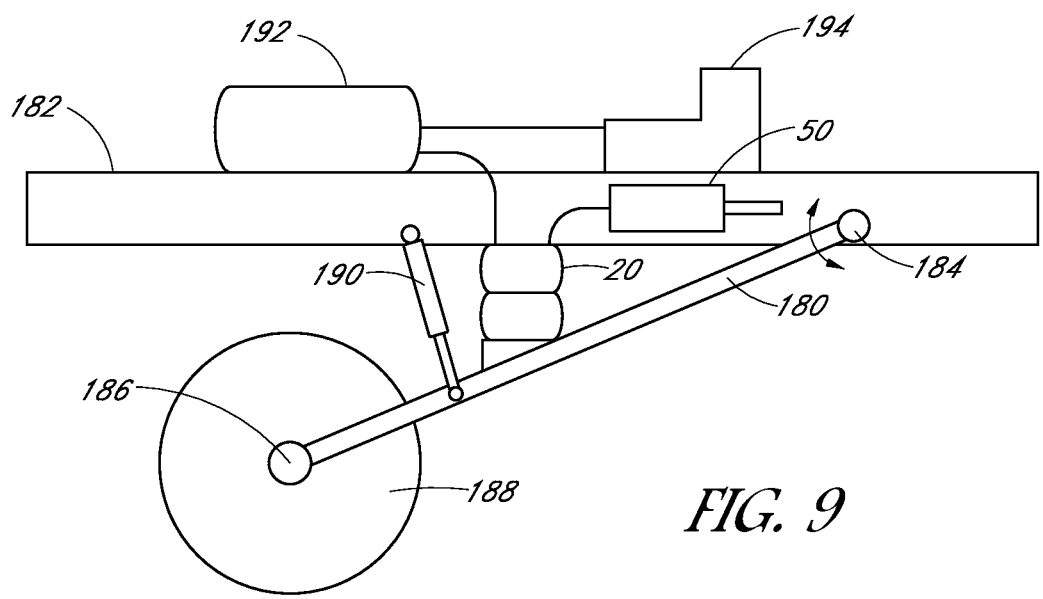
FIG. 9 is a schematic representation of a portion of a vehicle suspension employing a gas spring and an accumulator.

As noted, variable-volume accumulators 50 can be employed in multiple applications. FIG. 9 presents a schematic representation of a portion of a vehicle suspension in which a rotating arm 180 can be connected to a frame 182 at a hinge 184 so that the rotating arm 180 can rotate about the hinge 184. An end of the rotating arm 180 opposite the hinge 184 can be connected to an axle 186 about which a wheel 188 can rotate. A gas spring 20, which as illustrated can be a double convolute air bag, is interposed between the frame 182 and the rotating arm 180. A shock absorber 190 can also be interposed between the frame 182 and the rotating arm 180. An accumulator 50 can be mounted to the frame 182, and the gas spring 20 can be in communication with the accumulator 50. A holding tank 192, which can be pressurized by an air compressor 194 can be mounted on the frame 182 and configured to supply pressurized air to the gas spring 20 and accumulator 50. It is contemplated that electronic control structure and criteria can be applied as desired an appropriate.

Figure 10:
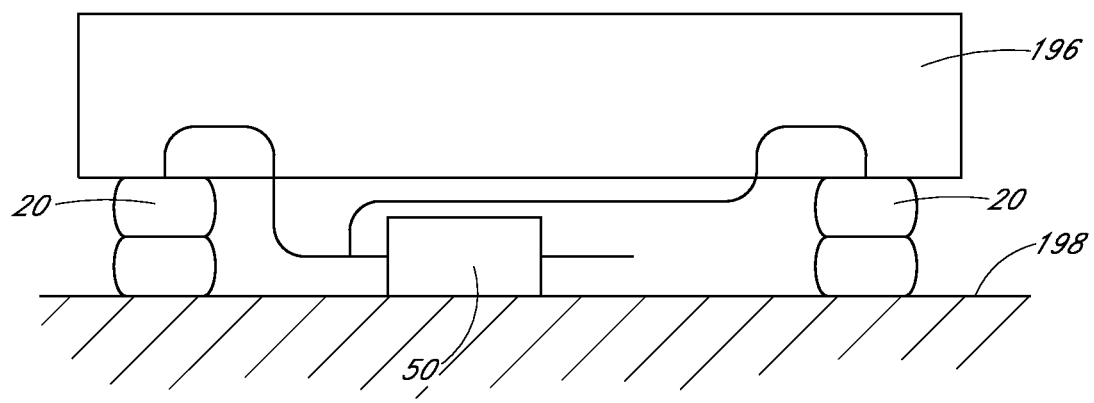
FIG. 10 is a schematic representation of a pneumatic system supporting an industrial device, in which the pneumatic system employs a gas spring and an accumulator.

FIG. 10 presents a schematic representation of a plurality of gas springs 20 being used to support an industrial device 196 above a floor 198 or other industrial device. The industrial device can be manufacturing equipment or any other device, and may be subject to a dynamic load and/or vibrations. The gas springs 20 can be placed in communication with a variable-volume accumulator 50. The gas springs 20 can reduce any effect of vibrations. The volume of the accumulator 50 can be adjusted both to achieve a desired spring responsiveness and to ensure that the spring rate of the springs 20 differs sufficiently from the natural frequency of the device's 196 vibrations so that excessive vibration is avoided. Of course, other components, such as suspension-type components, can be employed.

The embodiments and variations discussed above have disclosed structures with substantial specificity. This has provided a good context for disclosing and discussing inventive subject matter. However, it is to be understood that other variations may employ different specific structural shapes and interactions.

Although inventive subject matter has been disclosed in the context of certain preferred or illustrated variations and examples, it will be understood by those skilled in the art that the inventive subject matter extends beyond the specifically disclosed variations to other alternatives and/or uses of the invention and obvious modifications and equivalents thereof. In addition, while a number of variations have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. For example, electronic control and actuation components discussed in connection with FIG. 5 can be combined with variations discussed in connection with each of the other variations specifically-discussed herein. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed variations described above, but should be determined only by a fair reading of the claims that follow.

What is claimed is:

1. A gas spring system, comprising:
a gas spring configured to enclose a spring chamber and having a first mount and a second mount, the spring chamber defining a spring chamber volume therewithin;
an accumulator comprising an accumulator chamber, the accumulator chamber defining an accumulator volume;
a gas passage connected to both the gas spring and the accumulator provide fluid communication between the spring chamber and the accumulator chamber, the gas passage configured so that a pressurized gas can flow bidirectionally between the spring chamber and the accumulator chamber; and
a working volume of the gas spring system comprising a sum of the spring chamber volume and the accumulator volume that are fluidly connected to each other, the accumulator configured to selectively change the working volume of the gas spring system and modify a spring rate of the gas spring system, the spring rate being dependent on the working volume of the gas spring system;
wherein the accumulator comprises a piston, and movement of the piston changes the accumulator volume, and wherein the accumulator comprises an actuator configured to selectively move the piston to change the accumulator volume.

2. The gas spring system of claim 1, wherein the actuator is configured to be actuated by application of force external of the accumulator or gas spring.

3. The gas spring system of claim 1, wherein the actuator comprises a threaded rod configured to move the piston longitudinally when the threaded rod is rotated.

4. A gas spring system, comprising,
a gas spring configured to enclose a spring chamber and having a first mount and a second mount, the spring chamber defining a spring chamber volume therewithin;
an accumulator comprising an accumulator chamber, the accumulator chamber defining an accumulator volume;
a gas passage connected to both the gas spring and the accumulator provide fluid communication between the spring chamber and the accumulator chamber, the gas passage configured so that a pressurized gas can flow bidirectionally between the spring chamber and the accumulator chamber; and
a working volume of the gas spring system comprising a sum of the spring chamber volume and the accumulator volume that are fluidly connected to each other, the accumulator configured to selectively change the working volume of the gas spring system and modify a spring rate of the gas spring system, the spring rate being dependent on the working volume of the gas spring system;
wherein the gas spring and accumulator are configured so that when a load on the gas spring varies, the spring chamber volume changes and the accumulator volume remains the same;
wherein the accumulator comprises an actuator configured to change the accumulator volume.

5. The gas spring system of claim 4, wherein the accumulator is formed separately from the gas spring, and a gas passage connects the accumulator volume with the spring chamber volume.

6. The gas spring system of claim 5, further comprising a valve interposed in the gas passage, the valve configured to operate between an open position in which pressurized gas communicates freely bidirectionally through the gas passage and the valve between the accumulator chamber and the spring chamber so as to increase the working volume of the gas spring system, and a closed position in which pressurized gas is stopped from communicating through the gas passage between the accumulator chamber and the spring chamber so as to disable the accumulator from increasing the working volume of the gas spring system.

7. The gas spring system of claim 4, further comprising a flow control valve disposed between the accumulator chamber and the spring chamber, the flow control valve configured to restrict a gas flow rate from the accumulator chamber to the spring chamber.

8. A gas spring system, comprising
a gas spring configured to enclose a spring chamber and having a first mount and a second mount, the spring chamber defining a spring chamber volume therewithin;
an accumulator comprising an accumulator chamber, the accumulator chamber defining an accumulator volume;
a gas passage connected to both the gas spring and the accumulator provide fluid communication between the spring chamber and the accumulator chamber, the gas passage configured so that a pressurized gas can flow bidirectionally between the spring chamber and the accumulator chamber; and
a working volume of the gas spring system comprising a sum of the spring chamber volume and the accumulator volume that are fluidly connected to each other, the accumulator configured to selectively change the working volume of the gas spring system and modify a spring rate of the gas spring system, the spring rate being dependent on the working volume of the gas spring system;
wherein the gas spring and accumulator are configured so that when a load on the gas spring varies, the spring chamber volume changes and the accumulator volume remains the same
wherein the accumulator is formed separately from the gas spring, and a gas passage connects the accumulator volume with the spring chamber volume;
a valve interposed in the gas passage, the valve configured to operate between an open position in which pressurized gas communicates freely bidirectionally through the gas passage and the valve between the accumulator chamber and the spring chamber so as to increase the working volume of the gas spring system, and a closed position in which pressurized gas is stopped from communicating through the gas passage between the accumulator chamber and the spring chamber so as to disable the accumulator from increasing the working volume of the gas spring system;
a restricted-flow passage configured to equalize gas pressure between the spring chamber and the accumulator chamber when the valve is in the closed position, the restricted-flow passage configured to restrict gas flow sufficiently that the accumulator volume is not included in the working volume when the valve is in the closed position.

9. The gas spring system of claim 8, additionally comprising a source of pressurized gas configured to supply pressurized gas to both the spring chamber and the accumulator chamber.

10. A gas spring system, comprising,
   a gas spring configured to enclose a spring chamber and having a first mount and a second mount, the spring chamber defining a spring chamber volume therewithin;
   an accumulator comprising an accumulator chamber, the accumulator chamber defining an accumulator volume;
   a gas passage connected to both the gas spring and the accumulator provide fluid communication between the spring chamber and the accumulator chamber, the gas passage configured so that a pressurized gas can flow bidirectionally between the spring chamber and the accumulator chamber; and
   a working volume of the gas spring system comprising a sum of the spring chamber volume and the accumulator volume that are fluidly connected to each other, the accumulator configured to selectively change the working volume of the gas spring system and modify a spring rate of the gas spring system, the spring rate being dependent on the working volume of the gas spring system;
   wherein the gas spring and accumulator are configured so that when a load on the gas spring varies, the spring chamber volume changes and the accumulator volume remains the same;
   wherein an inlet passage and an outlet passage each communicate the accumulator chamber with the spring chamber, an outlet valve is disposed in the outlet passage, and an inlet valve is disposed in the inlet passage, the outlet valve being a check valve stopping gas from flowing to the accumulator chamber, the inlet valve being a check valve stopping gas from flowing from the accumulator chamber.

11. A method of changing a spring rate characteristics of a gas spring system that has a working chamber system that defines a working volume enclosing pressurized gas that is compressed to a first gas pressure when a first load is applied between a first mount and a second mount of the gas spring system, comprising:
   permitting flow of pressurized gas from a spring chamber to a accumulator chamber to increase the working volume of the working chamber system and to decrease a spring rate of the gas spring system; and
   wherein the gas spring system comprises a gas spring having a spring chamber defining a spring chamber volume and an accumulator having an accumulator chamber defining an accumulator volume, the working chamber system comprising the spring chamber and the accumulator chamber, the spring chamber being in fluid communication and allowing pressurized gas to bidirectionally flow between the accumulator chamber and the spring chamber, the working volume is a sum of the spring chamber volume and the accumulator volume, and increasing the working volume of the working chamber system comprises increasing the accumulator volume while keeping the spring chamber volume constant;
   stopping flow of pressurized gas from the spring chamber to the accumulator chamber to decrease the working volume of the working chamber system and to increase a spring rate of the gas spring system.

12. The method of claim 11, wherein the gas spring system is configured so that when a second load is applied between the first mount and the second mount, the spring chamber volume changes but the accumulator volume does not change.

13. The method of claim 11, further comprising an electronic control unit signaling an actuator to change the accumulator volume in response to input received by the electronic control unit.

14. The method of claim 11, wherein a gas passage extends from the spring chamber to the accumulator chamber and a valve is disposed in the gas passage.

15. A gas spring system, comprising:
   a gas spring configured to enclose a spring chamber and having a first mount and a second mount, the spring chamber defining a spring chamber volume therewithin;
   an accumulator comprising an accumulator chamber in fluid communication with the spring chamber so that a pressurized gas can flow between the spring chamber and the accumulator chamber, the accumulator chamber defining an accumulator volume; and
   a working volume of the gas spring system comprising a sum of the spring chamber volume and the accumulator volume, the accumulator configured to selectively change the working volume of the gas spring system;
   wherein the gas spring and the accumulator are configured so that when a load on the gas spring varies, the spring chamber volume changes and the accumulator volume remains the same;
   wherein an inlet passage and an outlet passage each communicate the accumulator chamber with the spring chamber, and a flow control valve is disposed in the outlet passage, the flow control valve configured to restrict a gas flow rate from the accumulator chamber to the spring chamber.

* * * * *